United States Patent
Wang et al.

(10) Patent No.: US 11,012,946 B2
(45) Date of Patent: May 18, 2021

(54) MODIFICATION OF BUFFER STATUS REPORTING FOR SUSTAINED CONNECTION

(71) Applicant: QUALCOMM Incorporated, San Diego, CA (US)

(72) Inventors: Shanshan Wang, San Diego, CA (US); Aziz Gholmieh, Del Mar, CA (US); Udara Fernando, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/723,983

(22) Filed: Dec. 20, 2019

(65) Prior Publication Data

US 2020/0213952 A1 Jul. 2, 2020

Related U.S. Application Data

(60) Provisional application No. 62/785,725, filed on Dec. 28, 2018.

(51) Int. Cl.
| | |
|---|---|
| *H04W 52/26* | (2009.01) |
| *H04W 52/30* | (2009.01) |
| *H04W 72/14* | (2009.01) |
| *H04W 72/12* | (2009.01) |
| *H04B 1/3827* | (2015.01) |

(52) U.S. Cl.
CPC ........ *H04W 52/267* (2013.01); *H04B 1/3838* (2013.01); *H04W 52/30* (2013.01); *H04W 72/1284* (2013.01); *H04W 72/14* (2013.01)

(58) Field of Classification Search
CPC .. H04B 1/3838; H04W 52/267; H04W 52/30; H04W 72/1284; H04W 72/1294; H04W 72/14

USPC .............. 455/69, 522, 422.1; 370/310, 329; 375/326; 1/1
See application file for complete search history.

(56) References Cited

U.S. PATENT DOCUMENTS

| | | | | |
|---|---|---|---|---|
| 6,421,327 | B1* | 7/2002 | Lundby | H04W 52/42 370/310 |
| 6,707,862 | B1* | 3/2004 | Larsson | H04L 25/0262 375/326 |
| 2008/0298702 | A1* | 12/2008 | Gunupudi | H04N 19/124 382/251 |
| 2009/0280798 | A1* | 11/2009 | Meylan | H04W 72/1284 455/422.1 |
| 2015/0341938 | A1* | 11/2015 | Tawashi | H04L 1/188 370/329 |

(Continued)

OTHER PUBLICATIONS

International Search Report and Written Opinion—PCT/US2019/068365—ISAEPO—dated Mar. 16, 2020.

(Continued)

*Primary Examiner* — Tan H Trinh
(74) *Attorney, Agent, or Firm* — Haynes and Boone, LLP

(57) ABSTRACT

Wireless communications systems and methods related to modifying a buffer status report (BSR) are provided. In one embodiment, a first wireless communication device determines a BSR based on at least a first data size and a predicted data size. The first wireless communication device transmits to a second wireless communication device, the BSR. The first wireless communication device receives from the second wireless communication device, a scheduling grant in response to the BSR. The first wireless communication device transmits to the second wireless communication device, a communication signal based on the scheduling grant.

28 Claims, 7 Drawing Sheets

(56) References Cited

U.S. PATENT DOCUMENTS

| | | | |
|---|---|---|---|
| 2016/0157256 A1* | 6/2016 | Tseng | H04W 28/0278 370/329 |
| 2017/0332333 A1 | 11/2017 | Santhanam et al. | |
| 2018/0167842 A1* | 6/2018 | Bergstrom | H04W 28/10 |
| 2018/0279353 A1* | 9/2018 | Shaheen | H04W 72/1284 |
| 2018/0279359 A1* | 9/2018 | Liu | H04W 72/0413 |
| 2018/0302918 A1* | 10/2018 | Shaheen | H04W 76/27 |
| 2018/0368173 A1* | 12/2018 | Shaheen | H04W 72/1289 |
| 2019/0166632 A1* | 5/2019 | Byun | H04W 52/00 |
| 2019/0215717 A1* | 7/2019 | Lee | H04W 24/10 |
| 2020/0077425 A1* | 3/2020 | Silverman | G06N 20/00 |
| 2020/0107219 A1* | 4/2020 | Jang | H04W 72/1268 |

OTHER PUBLICATIONS

Samsung: "New SPS Mechanism for Power Saving", 3GPP Draft, 3GPP TSG RAN WG1 Meeting #93, R1-1806691, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441893, 4 Pages, Retrieved from the Internet: URL: http://www.3gpp.org/ftp/Meetings%5F3GPP%5FSYNC/RAN1/Docs/, [retrieved on May 20, 2018], the whole document.

Sony: "Discussion and Proposal to UE Overheat Issue for NR", 3GPP Draft, 3GPP TSG RAN WG2 Meeting #99, R2-1709515 Disc Paper Overheat_Sony_0.3 (003), 3rd Generation Partnership Project (3GPP), Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017 (Aug. 20, 2017), XP051319239, pp. 1-5, Retrieved from the Internet: URL: http://www.3gpp.org/ftp/Meetings_3GPP_SYNC/RAN2/Docs/, [retrieved on Aug. 20, 2017], the whole document.

* cited by examiner though the present invention has been described with reference to specific embodiments thereof, it will be understood by those skilled in the art that various changes and modifications may be made without departing from the spirit and scope of the invention.

MODIFICATION OF BUFFER STATUS REPORTING FOR SUSTAINED CONNECTION

CROSS REFERENCE TO RELATED APPLICATIONS

This present application claims priority to and the benefit of U.S. Provisional Application No. 62/785,725, filed Dec. 28, 2018, which is hereby incorporated by reference in its entirety.

TECHNICAL FIELD

The technology discussed in this disclosure relates generally to wireless communication systems and methods, and more particularly to maintaining a communication link or connection in a frequency spectrum (e.g., a millimeter wave (mmWave) band) where transmission powers are limited by maximum permissible exposure (MPE) constraints. Certain embodiments can enable and provide improved communication techniques for a user equipment (UE) to adjust a buffer status report (BSR) in triggering a base station (BS) to grant the UE a desirable amount of uplink grants.

Introduction

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the Long-Term Evolution (LTE) technology to a next generation new radio (NR) technology. One technique for expanding connectivity may be to extend the frequency operation range to higher frequencies since lower frequencies are becoming overcrowded. For example, mmWave frequency bands between about 30 gigahertz (GHz) to about 300 GHz can provide a large bandwidth for high data rate communications. However, the mmWave frequency bands may have a higher path-loss compared to the lower frequency bands used by conventional (e.g., lower frequency) wireless communication systems.

To overcome the higher path-loss, BSs and UEs may use beamforming to form directional beams for communications. Practical application of beamforming in mmWave systems needs to overcome a number of constraints from regulatory perspectives. For example, Federal Communications Commission (FCC) and International Commission on Non-Ionizing Radiation Protection (ICNIRP) impose maximum permissible exposure (MPE) constraints on transmitters at various carrier frequencies. MPE constraints are typically specified in terms of short-term temporal averaging of radiated power, medium-term temporal averaging of radiated power, local-spatial averaging of radiated power, and/or medium-spatial averaging of radiated power. The imposing of the MPE constraints can prevent hazardous operating conditions, ensure users' health, and/or reduce electromagnetic pollution or noise from mmWave transmissions. Additionally, specific absorption rate (SAR) is a measure of the rate of radio frequency (RF) energy absorption by the body from the source being measured (e.g., from a cell phone). SAR provides a straightforward means for measuring the RF exposure characteristics of cell phones to ensure that they are within the safety guidelines set by the FCC.

The UE may adjust the transmission power to conform to MPE constraints. The back-off on the transmission power required due to regulatory requirements, however, may not provide optimal performance.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes determining, by a first wireless communication device, a buffer status report (BSR) based on at least a first data size and a predicted data size; transmitting, by the first wireless communication device to a second wireless communication device, the BSR; receiving, by the first wireless communication device from the second wireless communication device, a scheduling grant in response to the BSR; and transmitting, by the first wireless communication device to the second wireless communication device, a communication signal based on the scheduling grant.

In an additional aspect of the disclosure, an apparatus includes a processor configured to determine a BSR based on at least a first data size and a predicted data size. The apparatus also includes a transceiver configured to transmit the BSR to a wireless communication device; receive, from the wireless communication device, a scheduling grant in response to the BSR; and transmit, to the second wireless communication device, a communication signal based on the scheduling grant.

In an additional aspect of the disclosure, a computer-readable medium having program code recorded thereon, the program code includes code for causing a wireless communication device to determine a BSR based on at least a first data size and a predicted data size; code for causing the wireless communication device to transmit the BSR; code for causing the wireless communication device to receive a scheduling grant in response to the BSR; and code for causing the wireless communication device to transmit a communication signal based on the scheduling grant.

In an additional aspect of the disclosure, an apparatus includes means for determining a BSR based on at least a first data size and a predicted data size; means for transmitting the BSR; means for receiving a scheduling grant in response to the BSR; and means for transmitting a communication signal based on the scheduling grant.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
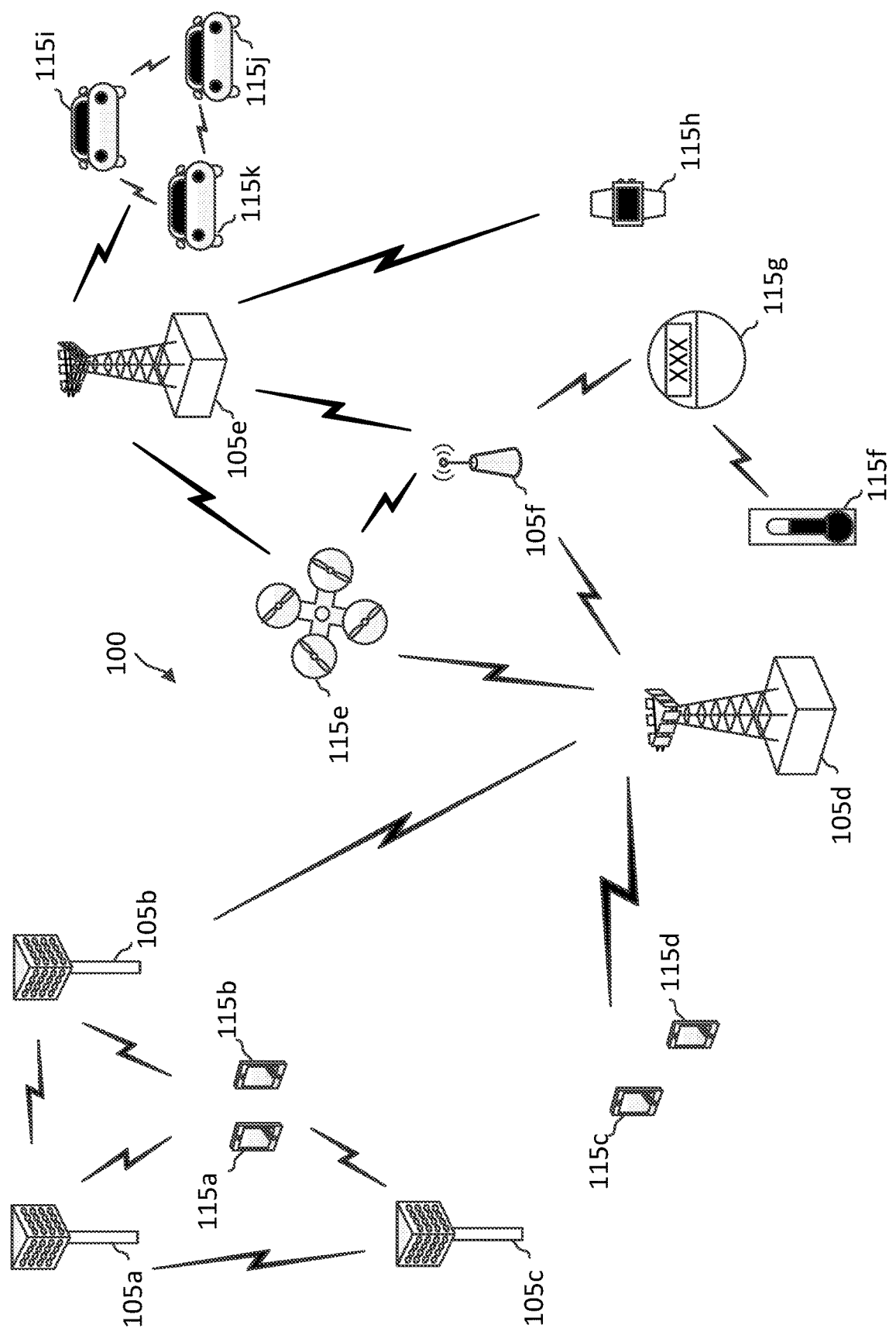
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, Long Term Evolution (LTE) networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved Universal Mobile Telecommunications System (UMTS) Terrestrial Radio Access (UTRA) (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and code division multiple access 2000 (cdma2000) is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP LTE is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented, or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for maintaining a communication link or connection in a frequency spectrum (e.g., a millimeter wave (mmWave) band) where transmission powers are limited by maximum permissible exposure (MPE) constraints. For example, the MPE constraints allow a certain amount of exposure over time. In an example, a UE may determine a predicted data size based on an energy budget and a per-bit transmission energy. The UE may predict an amount of data for transmission based on the updated energy budget and the energy-per-bit ratio. The predicted amount of data may be used in a proactive approach from the perspective of the UE to ensure compliance with the regulatory requirements. For example, rather than wait until the predicted data size rises above a threshold before reducing the transmission power, the UE may use the predicted amount of data to determine how much more energy may be consumed in future UL transmissions and still comply with the regulatory requirements. The UE adjusts a BSR in triggering a BS to grant the UE a desirable amount of UL grants. In an example, the UE may compare the actual amount of data ready for transmissions in the UL buffers with the predicted amount of data and select the smaller of the two for inclusion in a BSR.

Aspects of the present application can provide several benefits. For example, if the UE maintains the same or a similar pace for UL transmissions, leveraging the knowledge of the energy-per-bit ratio and predicting an amount of data for future transmissions may allow the UE to minimize the size of UL transmissions while boosting the transmission power. In this way, the UE may influence the network regarding sending a desirable amount of UL grants to the UE. Additionally, transmission power back-off in the mmWave frequency band may cause failure on UL more easily compared to other frequency bands. Accordingly, if operating in the mmWave frequency band, the boost of transmission power for the UL transmission may increase the probability that the UL data is received by the BS. As such, the disclosed embodiments can maintain a communication link or connection in a frequency spectrum and improve UL transmission performance.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing the network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an eNB or an access node controller (ANC)) may interface with the core network through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as a RRC connection. When the UE 115 is actively exchanging data with the BS 105, the UE 115 is in a RRC connected state.

In an embodiment, the network 100 may operate in a mmWave frequency band. The BSs 105 and the UEs 115 may include antenna arrays and may use analog beamforming and/or digital beamforming to form directional beams for communications. Transmission-related events may impact the UL and the DL channels in the mmWave systems. In mmWave systems, an imbalance in coverage between the UL and the DL may exist because the UL channel is particularly sensitive. One way to limit the exposure to comply with MPE and/or SAR constraints is to reduce the transmit power. If the UE reduces the transmission power, the UE may not be able to close the link in some cases. In some examples, the UE adjusts the BSR in triggering a BS to grant the UE a desirable amount of uplink grants. In an example, the BS may transmit scheduling grants to the UE that allow the UE to minimize the size of UL transmissions while boosting the transmission power for a short period of time. The boost in transmission power may close the link and avoid connection loss in UL. Mechanisms for maintaining a communication link or connection in a frequency spectrum (e.g., a mmWave band) based on adjusting a BSR are described in greater detail herein. To adjust the BSR, the UE may perform some calculations, such as determining a predicted data size based on an energy budget and a per-bit transmission energy and predicting an amount of data for transmission based on the energy budget and the energy-per-bit ratio, which are discussed in more detail below.

Figure 2:
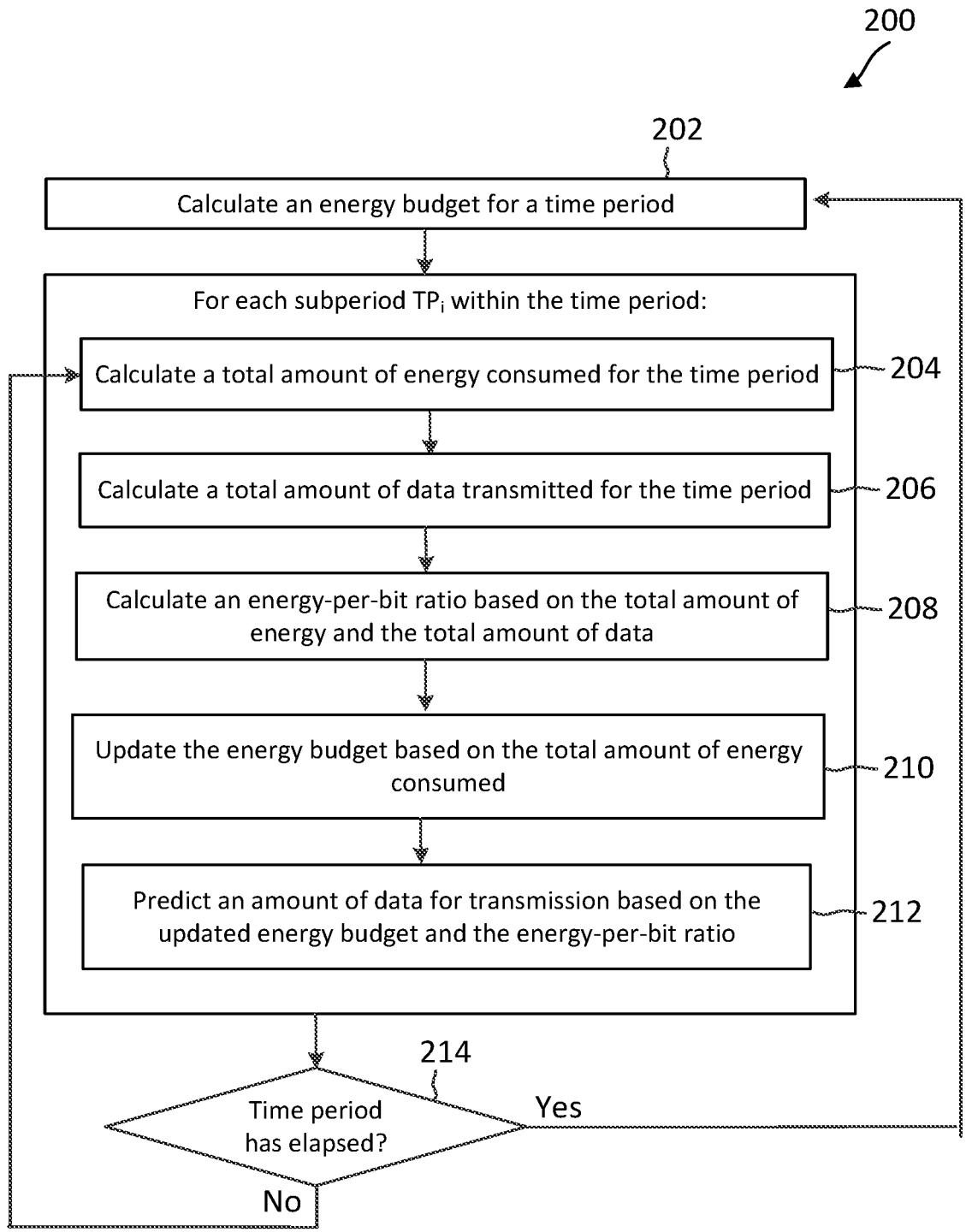
FIG. 2 is a flow diagram of a method for calculating a predicted data size according to some embodiments of the present disclosure.

FIG. 2 is a flow diagram of a method 200 for calculating a predicted data size according to some embodiments of the present disclosure. Steps of the method 200 can be executed by a computing device (e.g., a processor, processing circuit, and/or other suitable component) of a wireless communication device or other suitable means for performing the steps. For example, a wireless communication device, such as the UE 115, may utilize one or more components to execute the steps of method 200. As illustrated, the method 200 includes several enumerated steps, but embodiments of the method 200 may include additional steps before, after, and in between the enumerated steps. In some embodiments, one or more of the enumerated steps may be omitted or performed in a different order.

At step 202, the method 200 includes calculating an energy budget for a time period. The energy budget may ensure that the UE complies with the MPE and/or SAR requirements. The FCC limit for public exposure from cellular telephones is a SAR level of 1.6 watts per kilogram (1.6 W/kg). In an example, the maximum power for a time period of ten seconds is 200 mW, and the UE calculates an energy budget of 2 Joules at the beginning of every 10 seconds.

In some examples, the UE may calculate the energy budget for a time period based on a UL-DL slot configuration. A slot may be a DL slot, a UL slot, or a flexible slot. The UE may estimate the energy budget based on an assumption that each slot (or each flexible slot) in the configuration is a UL slot that the UE will use to transmit UL data. The network may transmit the slot configuration of the UL/DL assignments via RRC signaling to the UE. The BS may transmit a DL control channel including a slot format indicator (SFI) indicating a slot configuration. The SFI informs the UE whether a slot is DL, UL, or flexible slot and may indicate link direction over one or many slots through RRC signaling. If the slot configuration includes any flexible slots, the UE may assume these to be UL slots. The UE may be overly conservative in its estimate of the energy budget because the UE may overcount the UL slots. Based on the counted UL slots, the UE may calculate the energy budget for the time period. In some examples, the UE may estimate the energy budget based on an estimated transmission duty cycle. The UE may estimate the energy budget based on a history of how many UL scheduling opportunities the UE has been issued in the past and estimate the energy budget based on the history of UL data transmissions. For example, the UE may be granted a semi-persistent UL schedule (e.g., for a voice or video application). Thus, the UE may estimate the amount of upcoming UL scheduling grants based on the semi-persistent UL schedule.

The time period is divided into smaller subperiods $TP_i$. For each subperiod $TP_i$ within the time period, steps 204, 206, 208, 210, and 212 may be executed. The smaller the subperiod $TP_i$, the finer the granularity for comparing actual UL transmissions to predicted UL transmissions and determining how much UL data to transmit, as will be discussed further below. The UE may collect information on past UL transmissions based on the subperiod $TP_i$. The subperiod $TP_i$ may be a sliding window that is adjusted as time progresses or may be a block of time that repeats after the subperiod $TP_i$ elapses. In an example, the time period is 10 seconds, and the subperiod $TP_i$ is 2 seconds.

At step 204, the method 200 includes calculating a total amount of energy consumed for the time period. The UE may calculate the total amount of energy consumed in accordance with the following equation (1):

$$E\_consumed = \text{sum}_i\{(\text{Transmission power in TTI}\_i) * (\text{TTI}\_{i\_length}) * (I_{Tx}(\text{TTI}\_i))\}, \quad (1).$$

In equation (1), "E_consumed" indicates the actual energy that has been consumed thus far from the energy budget by the UE for UL transmissions for the time period. Additionally, the $I_{Tx}(\text{TTI}\_i)$ parameter is an indicator of whether the transmission can happen during the $\text{TTI}\_i$ and still be in compliance with the regulations. In an example, $I_{Tx}(\text{TTI}\_i)$ may be a first value (e.g., 0) if the accumulated energy consumed right before the current TTI has already met the energy budget. In this example, the UE does not transmit in the current TTI and all TTIs afterwards, until the next time period starts, or else the UE may be in violation of the regulations. In another example, $I_{Tx}(\text{TTI}\_i)$ may be a second value (e.g., 1) different from the first value if the accumulated energy consumed right before the current TTI has not yet met the energy budget. In this example, the UE may transmit in this TTI and would still be in compliance with the regulations.

In an example, the UE operates in the mmWave frequency band and transmits on the UL channel using directional beams. The UE may include a plurality of antennas that are transmitting at any one time. The UE may select an optimal beam and calculate the total amount of energy radiating in a particular direction. The UE may use less power for transmitting on the optimal beam, and accordingly the UE may factor this into its calculation of the energy budget.

At step 206, the method 200 includes calculating a total amount of data transmitted for the time period. The UE may calculate the total amount of UL data transmitted in accordance with the following equation (2):

$$B\_transmitted = \text{sum}_i\{\text{Number of data bits transmitted in TTI}\_i\}, \quad (2).$$

In equation (2), "B_transmitted" indicates the total amount of UL data that has been transmitted thus far by the UE for the time period.

At step 208, the method 200 includes calculating an energy-per-bit ratio based on the total amount of energy (from step 204) and the total amount of data (from step 206). The UE may calculate the energy-per-bit ratio in accordance with the following equation (3):

$$E\_per\_bit = \frac{E\_consumed}{B\_transmitted}. \quad (3)$$

In equation (3), "E_per_bit" represents the energy-per-bit ratio, which provides the average energy consumed per-transmitted-bit on the UL channel. The regulations allow a certain amount of exposure over time. The energy-per-bit ratio may be used in a proactive approach from the perspective of the UE to ensure compliance with the regulatory requirements. For example, rather than wait until the predicted data size rises above a threshold before reducing the transmission power, the UE may use the energy-per-bit ratio to determine how much more energy may be consumed in future UL transmissions and still be in compliance with regulatory requirements. If the UE maintains the same or a similar pace for UL transmissions, leveraging the knowledge of the energy-per-bit ratio may allow the UE to minimize the size of UL transmissions while boosting the transmission power. In this way, the UE may influence the network regarding sending a desirable amount of UL grants to the UE. Additionally, transmission power back-off in the mmWave frequency band may cause failure on UL more easily compared to other frequency bands. Accordingly, if operating in the mmWave frequency band, the boost of transmission power for the UL transmission may increase the probability that the UL data is received by the BS.

At step 210, the method 200 includes updating the energy budget based on the total amount of energy consumed (from step 204). The updated energy budget represents the remaining energy that the UE may consume and still comply with the regulations. The UE may update the energy budget in accordance with the following equation (4):

$$E\_budget(update) = \max(0, E\_budget(old) - E\_consumed), \quad (4).$$

In equation (4), "E_budget (update)" represents the new energy budget for the time period. The UE may compare zero with the difference between the old energy budget (E_budget (old)) and the energy consumed at step 204 (E_consumed) and select the greater of the two as the updated energy budget.

At step 212, the method 200 includes predicting an amount of data for transmission based on the updated energy budget and the energy-per-bit ratio. The UE may calculate the predicted amount of data in accordance with the following equation (5):

$$\text{Predicted\_data\_size} = \frac{E\_budget(update)}{E\_per\_bit}, . \quad (5)$$

In equation (5), "Predicted_data_size" represents the predicted amount of data for the UL transmission. The UE may predict how much more UL data can be transmitted in the remaining time period based on the updated energy budget and the energy-per-bit ratio.

At step 214, the method 200 includes determining whether the time period has elapsed. Responsive to a determination that the time period has elapsed, the method 200 proceeds to step 202, in which the method 200 includes calculating an energy budget for a time period. Responsive to a determination that the time period has not elapsed, the method 200 proceeds to step 204, in which the method 200 includes calculating a total amount of energy consumed for the time period. The amount of data predicted for transmission at step 212 is an estimate and may not represent the actual amount of transmitted data. For example, between the time from predicting the amount of data to the actual transmission, the amount of energy consumed may have changed. Accordingly, the UE may continue to readjust and re-calculate the predicted data size at every subperiod $TP_i$.

Figure 3:
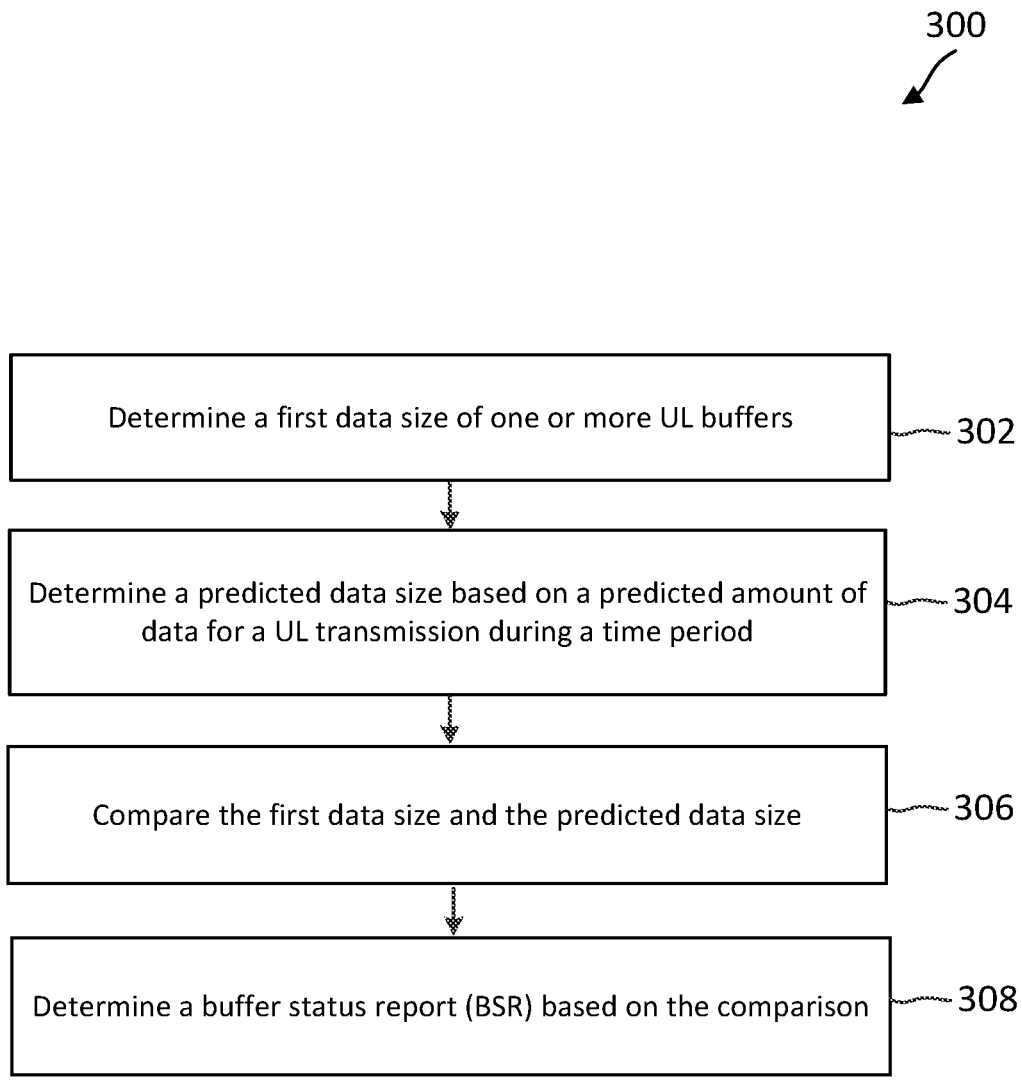
FIG. 3 is a flow diagram of a method for determining a buffer status report (BSR) according to some embodiments of the present disclosure.

FIG. 3 is a flow diagram of a method 300 for determining a BSR according to some embodiments of the present disclosure. Steps of the method 300 can be executed by a computing device (e.g., a processor, processing circuit, and/or other suitable component) of a wireless communication device or other suitable means for performing the steps. For example, a wireless communication device, such as the UE 115, may utilize one or more components to execute the steps of method 300. As illustrated, the method 300 includes a number of enumerated steps, but embodiments of the method 300 may include additional steps before, after, and in between the enumerated steps. In some embodiments, one or more of the enumerated steps may be omitted or performed in a different order.

At step 302, the method 300 includes determining a first data size of one or more UL buffers. In an example, the UE determines the first data size by determining how much data the UE has in its UL buffers for a UL transmission to a BS.

At step 304, the method 300 includes determining a predicted data size based on a predicted amount of data for a UL transmission during a time period. At step 306, the method 300 includes comparing the first data size with the predicted data size. The predicted data size may correspond to the predicted amount of data in step 212 of FIG. 2. In an example, the UE calculates the predicted data size, which may be based on the updated energy budget and the energy-per-bit ratio.

At step 308, the method 300 includes determining a BSR based on the comparison. To determine the BSR, the UE determines a BSR size (e.g., number of data bytes ready for transmission) to include in the BSR. The BSR size indicates to the BS how much data the UE has to transmit. The BS receives the BSR and may provide the UE with one or more scheduling grants based on the BSR size. In an example, the UE may determine the BSR size in accordance with the following equation (6):

$$\text{BSR size}=\text{minimum}(\text{first\_data\_size},\text{Predicted\_data\_size}), \quad (6).$$

In equation (6), "BSR size" is the data size that is included in the BSR. The UE may compare the first data size (e.g., actual amount of data ready for transmissions in the UL buffers) with the predicted data size and select the smaller of the two values as the BSR size for inclusion in the BSR. In an example, the first data size is greater than the predicted data size. In another example, the first data size is not greater than the predicted data size. By transmitting less data in the UL channel, the UE may transmit at a higher transmission power and ensure that the link is closed in the UL. In other words, the UE may limit the amount of UL data ready for transmissions (e.g., the BSR size) reported to the BS, and thus the amount of UL grants received from the BS and the amount UL data transmissions over a period of time such that the UE may maintain a sufficiently high total transmit power (e.g., without power back-off) and still satisfy the MPE constraints.

Figure 4:
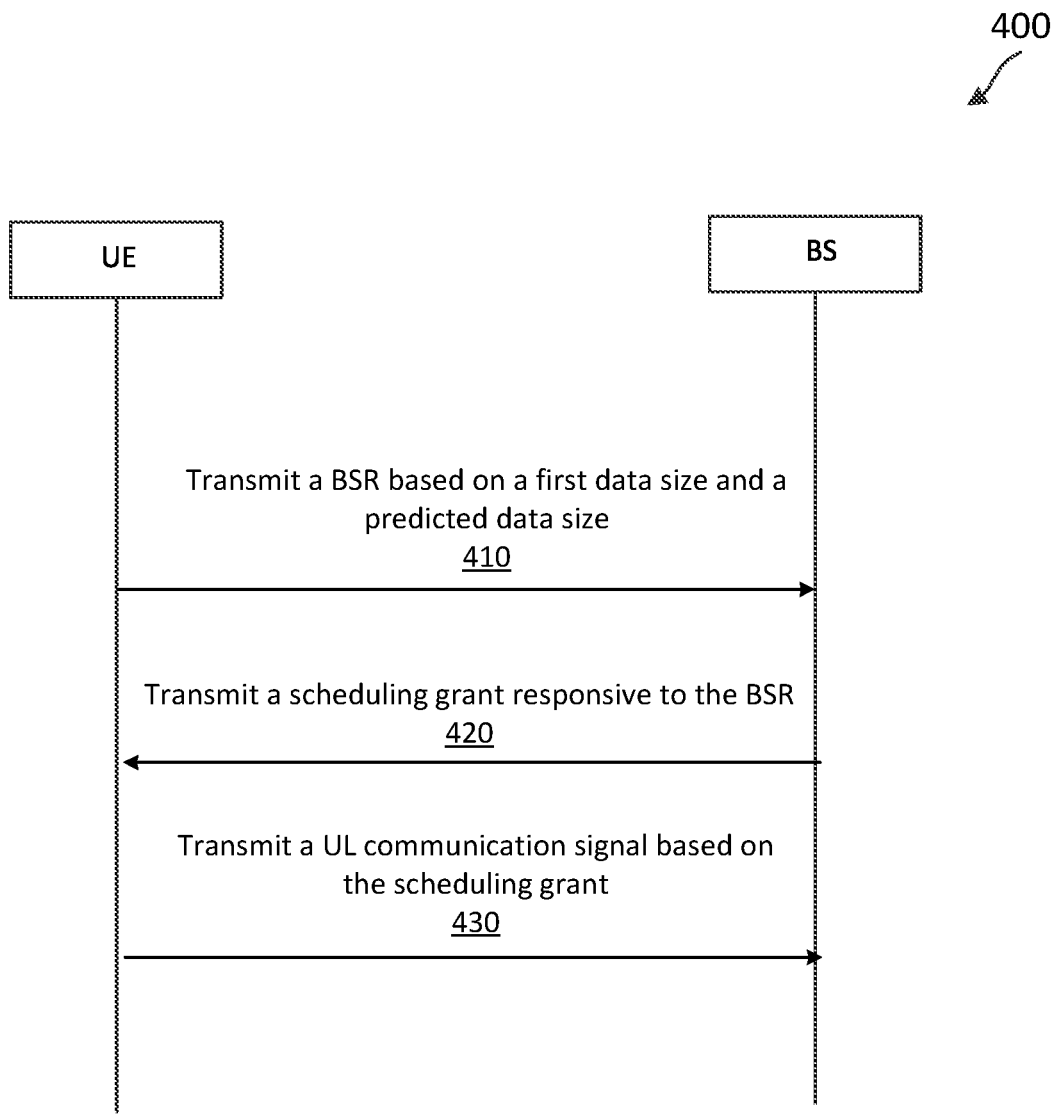
FIG. 4 is a signaling diagram of a communication method for an uplink (UL) transmission based on a BSR size according to some embodiments of the present disclosure.

FIG. 4 is a signaling diagram of a communication method 400 for a UL transmission based on a BSR size according to some embodiments of the present disclosure. The method 400 is implemented by a BS (e.g., the BS 105) and a UE (e.g., the UE 115) in a network (e.g., the network 100). Steps of the method 400 can be executed by computing devices (e.g., a processor, processing circuit, and/or other suitable component) of a wireless communication device (e.g., BS or UE) or other suitable means for performing the steps. As illustrated, the method 400 includes a number of enumerated steps, but embodiments of the method 400 may include additional steps before, after, and in between the enumerated steps. In some embodiments, one or more of the enumerated steps may be omitted or performed in a different order.

At step 410, the UE transmits a BSR based on a first data size and a predicted data size. The first data size may represent an amount of data stored in the UE's buffer for UL transmission. The UE may execute steps provided in FIG. 2 for determining the predicted data size and steps provided in FIG. 3 for determining the BSR size to include in the BSR. In an example, the UE determines the BSR size by selecting the lesser of the first data size and the predicted data size and includes the BSR size in the BSR. The BS receives the BSR.

At step 420, the BS transmits a scheduling grant responsive to the BSR. The UE receives the scheduling grant. At step 430, the UE transmits a UL communication signal based on the scheduling grant.

The use of the predicted data size may provide for improved cross-layer interactions between upper and lower layers (e.g., the media access control (MAC) and physical (PHY) layers). The UE may transmit the BSR at the MAC layer to the BS, influencing the use of the PHY layer by changing transmission parameters (e.g., predicted data size values) at the MAC layer. If the UE has a large amount of data to transmit in the UL channel, the transmit power may be reduced at the PHY layer. Rather than having the PHY layer reduce the transmit power as a result of the UE having a large amount of data to transmit in the UL channel, the UE may include information in the MAC layer (e.g., the BSR) that allows the PHY layer to maintain or boost its transmission power by transmitting smaller chunks of data in the UL channel.

For some applications, it may be more efficient for the UE to receive a large number of scheduling grants, with each scheduling grant indicating a small amount of UL data to be transmitted (e.g., email applications). For other applications, it may be more efficient for the UE to receive a small number of scheduling grants, with each scheduling grant indicating a large amount of UL data to be transmitted and the grants being spaced further apart (e.g., UL bursts for streaming applications).

The UE may desire to pace the size of its UL transmissions so that the UE can transmit UL data at a higher transmission power. For example, the UE may report and transmit fewer bytes than the amount of data stored in the UE's buffer. By way of illustration, if the UE has 100 bytes stored in its UL buffer for transmission in the UL channel, rather than transmitting all 100 bytes within the next 5 seconds, the UE may pace out the UL transmissions into 20 second intervals. The BS may schedule the UE with two TTIs rather than four TTIs, over a duration of time. The UE may break up the amount of data in the buffer into multiple transmissions, so that the UE may boost the UL transmission power for each of these transmissions. Accordingly, the UE may communicate with the BS via the MAC layer to report the BSR, and the PHY layer may transmit data on the UL channel at a higher transmission power and using a shorter time duration, compared to transmitting all 100 bytes at once.

It may be desirable for the UE to maintain the UL channel and avoid connection loss in the UL. This may be especially challenging for operations in the mmWave frequency bands due to its shorter wavelength and more sensitive transmissions. In some examples, the UE may transmit the BSR, which includes the BSR size, to the BS once. The UE may pace out the transmissions even further and include the quotient of ((BSR size)/N) in the BSR and transmit the BSR over N instances within a subperiod $TP_i$. For example, the UE may transmit a plurality of BSRs (e.g., N BSRs) within a time period, where each BSR of the plurality of BSRs includes a BSR sub-size, and the BSR sub-size corresponds to the BSR size divided by the number (e.g., N) of BSRs included in the plurality of BSRs. In other words, the UE divides the BSR size by N and transmits the BSR, which includes the quotient (e.g., BSR sub-size) of the BSR size divided by N, over N instances, where N is a number greater than one. Accordingly, the UE may configure the BSR in such a way that, for example, the UE predicts and transmits 100 bytes at once on the UL channel or transmits 10 bytes every 20 ms.

As discussed, the UE may calculate an energy budget for a time period (see step 202 of FIG. 2). The UE may take into account various factors for the energy budget calculation. In some examples, the UE takes into account PUCCH for calculation of the energy budget. For example, the UE may determine the BSR size based on the amount of the UL data and an estimate of the amount of control information. For example, the UE may subtract the estimate of the amount of control information from an initial energy budget to calculate the energy budget at step 202. The PUCCH is a UL physical channel that carries UL control information (UCI), which may include feedback based on DL data previously transmitted by a BS. The BS transmits DL data to the UE. To maintain a consistent DL connection, the UE may transmit the feedback on the UL channel. The feedback may be an acknowledgement (ACK) indicating that reception of the DL data by the UE is successful or may be a negative-acknowledgement (NACK) indicating that reception of the DL data by the UE is unsuccessful (e.g., including an error or failing an error correction). The feedback may be indicated by an ACK/NACK, which may be represented by one bit.

It may be desirable to balance the maintenance of the DL connection with other UL (e.g., feedback) for data transmissions. In some examples, the UE reserves a PUCCH energy budget for the critical UL channel that serves for providing feedback for the DL data (e.g., PDCCH used to send ACK/NACK for DL). The UE may define part of the PUCCH energy budget as being dedicated to PUCCH. The PUCCH energy budget may refer to a portion of energy for maintaining the DL connection. In an example, the PUCCH energy budget applies towards transmission on the PUCCH only. Referring to FIG. 2, at step 202, the UE may calculate the energy budget by subtracting the PUCCH energy budget from a current energy budget for the time period, and then proceed to step 204. In an example, the UE may predict, based on the energy budget, that it may transmit 10,000 bits over the time period and still comply with regulatory requirements. From the 10,000 bits, the UE may determine to transmit 8,000 bits (UL data) and reserve the other 2,000 bits for providing feedback on the UL channel (e.g., ACK/NACK). Referring to equation (4) above, if no energy is left over for transmission on the UL channel, the updated energy budget may be zero and the UE may report that it has no data to transmit in the BSR.

The UE may use various techniques for estimating the PUCCH energy budget. In some examples, the UE may estimate the PUCCH energy budget based on the UL-DL slot configuration. A slot may be a DL slot, a UL slot, or a flexible slot. The UE may estimate the PUCCH energy budget based on an assumption that each slot (or each flexible slot) in the configuration is a DL slot and the UE transmits feedback for the DL data. The network may transmit the slot configuration of the UL/DL assignments via RRC signaling to the UE. If the slot configuration includes any flexible slots, the UE may assume these to be DL slots. The BS may transmit a DL control channel including a slot format indicator (SFI) indicating a slot configuration. The SFI informs the UE whether a slot is DL, UL, or flexible slot and may indicate link direction over one or many slots through RRC signaling. The UE may be conservative in its estimate of the PUCCH energy budget because the UE may overcount the DL slots. Some DL slots may be for other UEs, and the UE is not guaranteed DL data for all counted DL slots.

In some examples, the UE may estimate the PUCCH energy budget based on an estimated duty cycle. The UE may estimate the PUCCH energy budget based on a history of how many scheduling opportunities the UE has been issued in the past and accordingly estimate the number of scheduling opportunities the UE can expect in the future. In an example, the UE may collect histories or statistics of DL receptions from BSs and estimate an amount of feedback data for the DL receptions. The UE may desire to reserve, based on the estimated number of feedbacks, energy dedicated for providing the feedback on the critical UL channel. In some examples, the UE may estimate the PUCCH energy budget based on a traffic type. For example, if a user is attempting to upload pictures, the UE may estimate that a high number of the slots will be UL slots. In another example, if a user is attempting to retrieve a webpage, the UE may estimate that a high number of the slots will be DL slots. In this example, the UE may leverage this knowledge and reserve more power for UL transmissions for the control channel. In another example, if the traffic is Voice over Long-Term Evolution (VoLTE) traffic, the UE may leverage this knowledge that the traffic will be periodic. Although the UE has been described as reserving energy for the UL critical channels or the ACK/NACK channel, the UE may also reserve energy for other channels (e.g., PDCCH channel).

Figure 5:
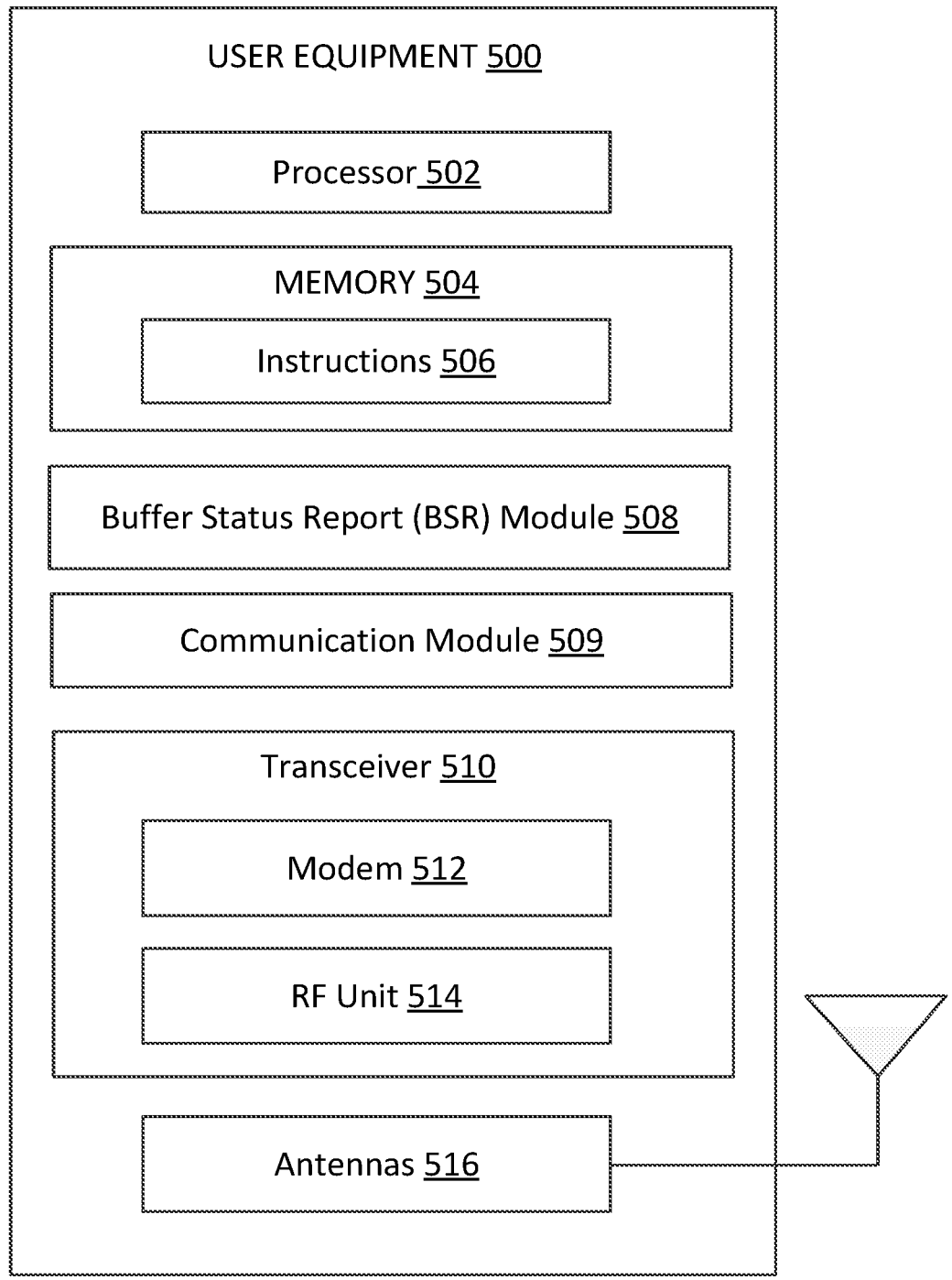
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 115 in the network 100 as discussed above. As shown, the UE 500 may include a processor 502, a memory 504, a BSR module 508, a communication module 509, a transceiver 510 including a modem subsystem 512 and a radio frequency (RF) unit 514, and one or more antennas 516. These elements may be in direct or indirect communication with each other, for example via one or more buses. A wireless communication device, such as the UE 115 or the UE 500, may utilize one or more components, such as the processor 502, the memory 504, the BSR module 508, the communication module 509, the transceiver 510, the modem 512, and/or the one or more antennas 516, to execute the steps of methods 200, 300, and/or 400.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magneto-resistive RAM (MRAM), read-only memory (ROM), programmable read-only memory (PROM), erasable programmable read only memory (EPROM), electrically erasable programmable read only memory (EEPROM), flash memory, solid-state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause or instruct the processor 502 to perform the operations described herein with reference to the UEs 115 in connection with embodiments of the present disclosure, for example, aspects of FIGS. 2, 3, 4, and 7. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The BSR module 508 and/or the communication module 509 may be implemented via hardware, software, or combinations thereof. For example, the BSR module 508 and/or the communication module 509 may be implemented as a processor, circuit, and/or instructions 506 stored in the memory 504 and executed by the processor 502. In some examples, the BSR module 508 and/or the communication module 509 can be integrated within the modem subsystem 512. In some examples, the BSR module 508 and/or the communication module 509 may be implemented by a DSP within the modem subsystem 512. The BSR module 508 and/or the communication module 509 may be used for various aspects of the present disclosure, for example, aspects of FIGS. 2, 3, 4, and 7.

The BSR module 508 is configured to determine a buffer status report (BSR) based on at least a first data size and a predicted data size. In an example, the BSR module 508 selects the smaller of the first data size and the predicted data size for inclusion in the BSR. The communication module 509 is configured to transmit to a wireless communication device (e.g., BS 105), the BSR. The communication module 509 is further configured to receive from the wireless communication device, a scheduling grant in response to the BSR. The communication module 509 is configured to transmit to the wireless communication device, a communication signal based on the scheduling grant. In an example, the scheduling grant is a UL scheduling grant, and the communication signal is a UL signal.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504, the BSR module 508, and/or the communication module 509 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

In an embodiment, the UE 500 can include multiple transceivers 510 implementing different RATs (e.g., NR and LTE). In an embodiment, the UE 500 can include a single transceiver 510 implementing multiple RATs (e.g., NR and LTE). In an embodiment, the transceiver 510 can include various components, where different combinations of components can implement RATs.

Figure 6:
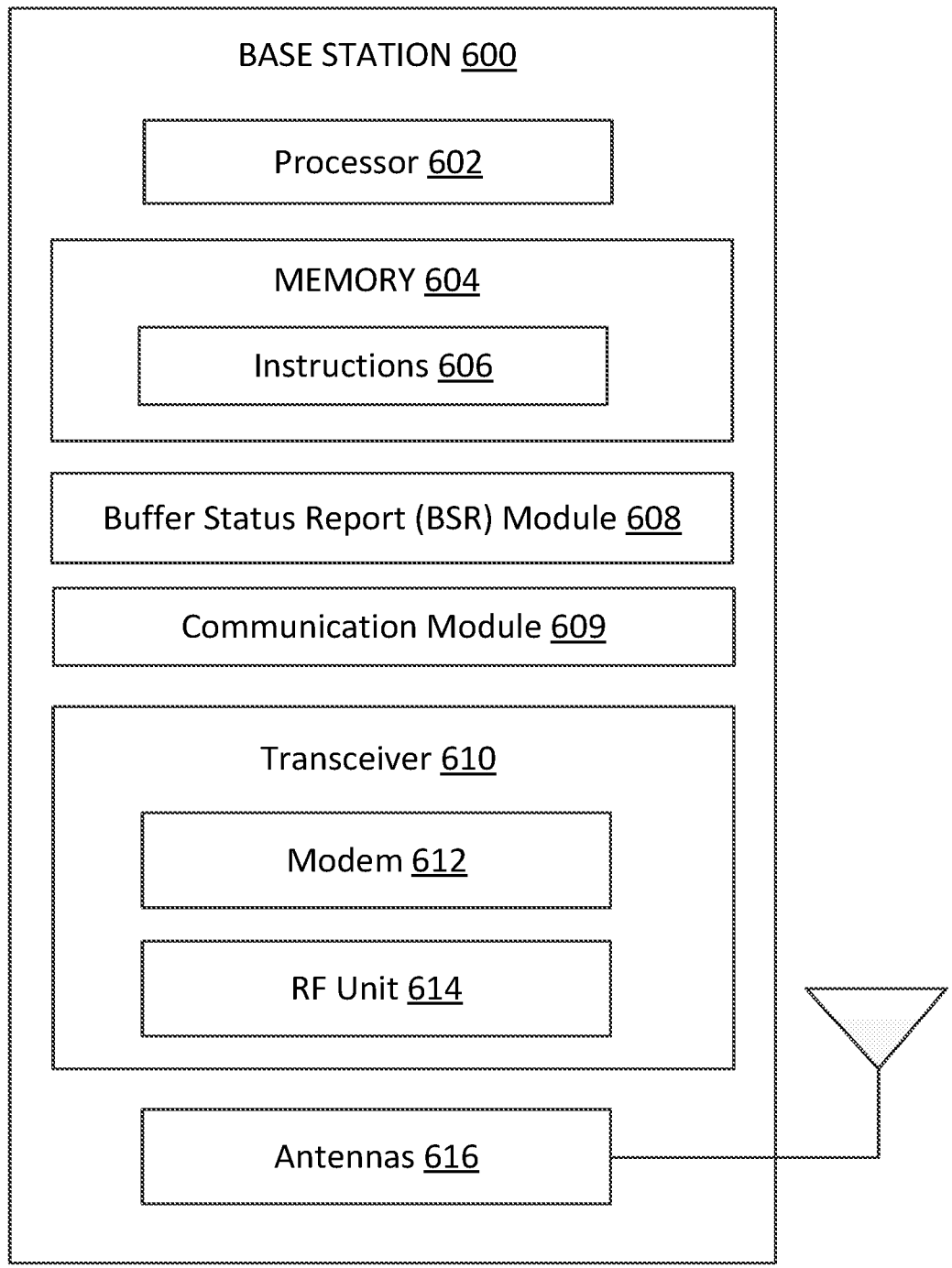
FIG. 6 is a block diagram of an exemplary base station (BS) according to embodiments of the present disclosure.

FIG. 6 is a block diagram of an exemplary BS 600 according to embodiments of the present disclosure. The BS 600 may be a BS 105 in the network 100 as discussed above. A shown, the BS 600 may include a processor 602, a memory 604, a BSR module 608, a communication module 609, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause or instruct the processor 602 to perform operations described herein, for example, aspects of FIG. 4. Instructions 606 may also be referred to as code, which may be interpreted broadly to include any type of computer-readable statement(s) as discussed above with respect to FIG. 5.

The BSR module 608 and/or the communication module 609 may be implemented via hardware, software, or combinations thereof. For example, the BSR module 608 and/or the communication module 609 may be implemented as a processor, circuit, and/or instructions 606 stored in the memory 604 and executed by the processor 602. In some examples, the BSR module 608 and/or the communication module 609 may be implemented by a DSP within the modem subsystem 612. The BSR module 608 and/or the communication module 609 may be used for various aspects of the present disclosure, for example, aspects of FIGS. 4 and 7.

The BSR module 608 is configured to receive a BSR from a wireless communication device (e.g., UE 115 or UE 500), the BSR being based on at least a first data size and a predicted data size. The BSR may provide the BSR module 608 with information regarding how much data the UE has to transmit to the BS. The communication module 609 is configured to transmit to the wireless communication device, a scheduling grant in response to the BSR. The communication module 609 is further configured to receive from the wireless communication device, a communication signal based on the scheduling grant. In an example, the scheduling grant is a UL scheduling grant, and the communication signal is a UL signal.

As shown, the transceiver 610 may include the modem subsystem 612 and the RF unit 614. The transceiver 610 can be configured to communicate bi-directionally with other devices, such as the UEs 115 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices and provide the received data messages for processing and/or demodulation at the transceiver 610. The antennas 616 may include multiple antennas of similar or different designs in order to sustain multiple transmission links.

In an embodiment, the BS 600 can include multiple transceivers 610 implementing different RATs (e.g., NR and LTE). In an embodiment, the BS 600 can include a single transceiver 610 implementing multiple RATs (e.g., NR and LTE). In an embodiment, the transceiver 610 can include various components, where different combinations of components can implement RATs.

Figure 7:
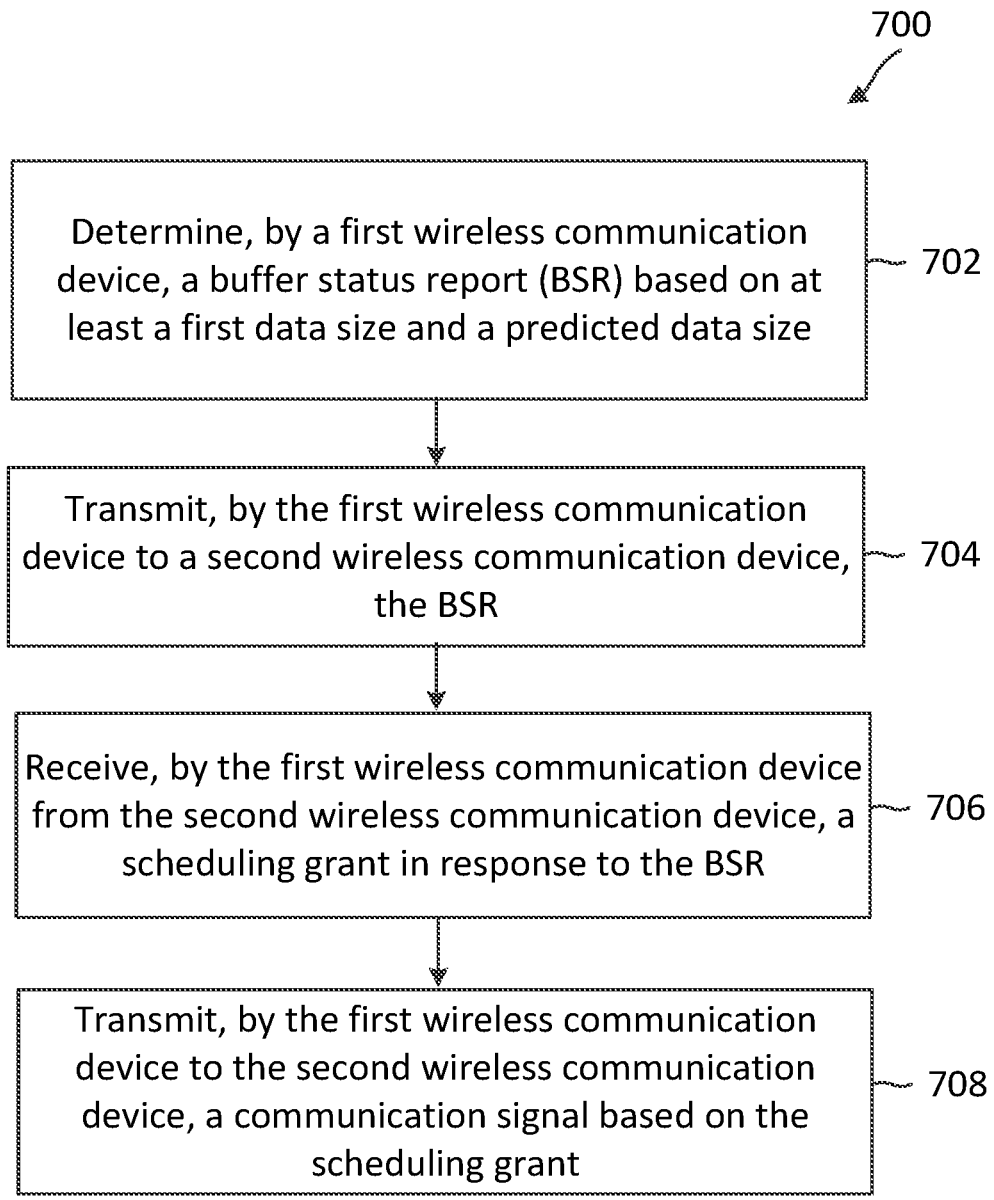
FIG. 7 is a flow diagram of a communication method according to some embodiments of the present disclosure.

FIG. 7 is a flow diagram of a communication method 700 according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the UE 115 or UE 500, may utilize one or more components, such as the processor 502, the memory 504, the BSR module 508, the communication module 509, the transceiver 510, the modem 512, and/or the one or more antennas 516, to execute the steps of method 700. The method 700 may employ similar mechanisms as in the methods 200, 300, and 400 as described with respect to FIGS. 2, 4, and 6, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 702, the method 700 includes determining, by a first wireless communication device, a buffer status report (BSR) based on at least a first data size and a predicted data size. In an example, the first wireless communication device is a UE. The UE may determine the predicted data size based on an energy budget and a per-bit transmission energy. The UE may predict an amount of data for transmission based on the energy budget and the energy-per-bit ratio.

In some examples, the UE determines the first data size based on one or more UL buffers and determines the predicted data size based on the predicted amount of data for a UL transmission. The UE may compare the first data size and the predicted data size and determine, based on the comparison, the BSR. In an example, the UE determines whether the first data size is smaller than the predicted amount of data. The UE may select the first data size as a BSR size responsive to a determination that the first data size is smaller than the predicted data size. Conversely, the UE may select the predicted data size as the BSR size responsive to a determination that the first data size is not smaller than the predicted data size. The BSR that is sent to the BS includes the BSR size. In an example, the UE may transmit the BSR to the BS once, where the BSR includes the BSR size. In another example, the UE transmits a plurality of BSRs (e.g., N BSRs) within a time period, where each BSR of the plurality of BSRs includes a BSR sub-size, and the BSR sub-size corresponds to the BSR size divided by the number (e.g., N) of BSRs included in the plurality of BSRs.

In some examples, the UE calculates the predicted data size by calculating the energy budget for a time period. Additionally, for each subperiod within the time period, the UE calculates a total amount of energy consumed for the time period, calculates a total amount of data transmitted for the time period, calculates the energy-per-bit ratio based on the total amount of energy consumed and the total amount of data, and updates the energy budget based on the total amount of energy consumed.

The UE may calculate the energy budget using various techniques. In an example, the UE calculates the energy budget by estimating an amount of UL data for transmission to the BS during the time period. The amount of UL data may be, for example, based on a UL-DL slot configuration indicated by the BS or based on a history of UL data previously transmitted by the UE to BS. In an example, the UE calculates the energy budget by estimating an amount of uplink control information for transmission to the BS during the time period. The amount of uplink control information may be, for example, based on a UL-DL slot configuration indicated by the BS or based on a history of DL data previously received by the UE from BS. The uplink control information may include a feedback for the DL data.

At step 704, the method 700 includes transmitting, by the first wireless communication device to a second wireless communication device, the BSR. At step 706, the method 700 includes receiving, by the first wireless communication device from the second wireless communication device, a scheduling grant in response to the BSR. At step 708, the method 700 includes transmitting, by the first wireless communication device to the second wireless communication device, a communication signal based on the scheduling grant.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, by a first wireless communication device, a predicted data size based on an energy budget and a per-bit transmission energy;
   determining, by the first wireless communication device, a buffer status report (BSR) based on at least a first data size and the predicted data size;
   transmitting, by the first wireless communication device to a second wireless communication device, the BSR;
   receiving, by the first wireless communication device from the second wireless communication device, a scheduling grant in response to the BSR; and
   transmitting, by the first wireless communication device to the second wireless communication device, a communication signal based on the scheduling grant.

2. The method of claim 1, wherein the first wireless communication device is a user equipment (UE).

3. The method of claim 1, wherein the first data size is greater than the predicted data size.

4. The method of claim 1, further comprising:
   predicting an amount of data for transmission based on the energy budget and an energy-per-bit ratio.

5. The method of claim 4, further comprising:
   determining, by the first wireless communication device, the first data size based on one or more UL buffers; and
   comparing the first data size and the predicted data size, wherein determining the BSR includes determining, based on comparing the first data size and the predicted data size, the BSR.

6. The method of claim 4, further comprising:
   determining whether the first data size is smaller than the predicted data size;
   selecting the first data size as a BSR size responsive to a determination that the first data size is smaller than the predicted data size; and
   selecting the predicted data size as the BSR size responsive to a determination that the first data size is not smaller than the predicted data size.

7. The method of claim 6, wherein the BSR includes the BSR size.

8. The method of claim 6, wherein the transmitting the BSR includes:
   transmitting a plurality of BSRs within a time period, wherein each BSR of the plurality of BSRs includes a BSR sub-size, and wherein the BSR sub-size corresponds to the BSR size divided by a number of BSRs included in the plurality of BSRs.

9. The method of claim 1, wherein determining the predicted data size includes:
   calculating, by the first wireless communication device, the energy budget for a time period; and
   for each subperiod within the time period:
     calculating a total amount of energy consumed for the time period;
     calculating a total amount of data transmitted for the time period;
     calculating the energy-per-bit ratio based on the total amount of energy consumed and the total amount of data; and
     updating the energy budget based on the total amount of energy consumed.

10. The method of claim 9, wherein calculating the energy budget includes estimating an amount of UL data for transmission to the second wireless communication device during the time period, the amount of UL data being based on a UL-DL slot configuration indicated by the second wireless communication device.

11. The method of claim 9, wherein calculating the energy budget includes estimating an amount of UL data for transmission to the second wireless communication device during the time period, the amount of UL data being based on a history of UL data previously transmitted by the first wireless communication device to the second wireless communication device.

12. The method of claim 9, wherein calculating the energy budget includes estimating an amount of uplink control information for transmission to the second wireless communication device during the time period, the amount of uplink control information being based on a UL-DL slot configuration indicated by the second wireless communication device.

13. The method of claim 9, wherein calculating the energy budget includes estimating an amount of uplink control information for transmission to the second wireless communication device during the time period, the amount of uplink control information being based on a history of DL data previously received by the first wireless communication device from the second wireless communication device, wherein the uplink control information includes a feedback for the DL data.

14. An apparatus comprising:
   a processor configured to:
     determine the predicted data size based on an energy budget and a per-bit transmission energy; and
     determine a buffer status report (BSR) based on at least a first data size and the predicted data size; and
   a transceiver configured to:
     transmit the BSR to a wireless communication device;
     receive, from the wireless communication device, a scheduling grant in response to the BSR; and
     transmit, to the wireless communication device, a communication signal based on the scheduling grant.

15. The apparatus of claim 14, wherein the wireless communication device is a base station (BS).

16. The apparatus of claim 14, wherein the first data size is greater than the predicted data size.

17. The apparatus of claim 16, wherein the processor is configured to select the predicted data size for inclusion in the BSR in response to the first data size being greater than the predicted data size.

18. The apparatus of claim 14, wherein the first data size is not greater than the predicted data size.

19. The apparatus of claim 18, wherein the processor is configured to select the first data size for inclusion in the BSR in response to the first data size not being greater than the predicted data size.

20. The apparatus of claim 14, wherein the processor is configured to predict an amount of data for transmission based on the energy budget and an energy-per-bit ratio.

21. The apparatus of claim 14, wherein the processor is configured to calculate the energy budget for a time period.

22. The apparatus of claim 21, wherein the processor is configured to estimate an amount of UL data for transmission to the wireless communication device during the time period, and wherein the amount of UL data is based on a UL-DL slot configuration indicated by the wireless communication device.

23. The apparatus of claim 21, wherein the processor is configured to estimate an amount of UL data for transmission to the wireless communication device during the time period, and wherein the amount of UL data is based on a history of UL data previously transmitted to the wireless communication device.

24. The apparatus of claim 21, wherein the processor is configured to estimate an amount of uplink control information for transmission to the wireless communication device during the time period, and wherein the amount of uplink control information is based on a UL-DL slot configuration indicated by the wireless communication device.

25. The apparatus of claim 21, wherein the processor is configured to estimate an amount of uplink control information for transmission to the wireless communication device during the time period, and wherein the amount of uplink control information is based on a history of DL data previously received from the wireless communication device.

26. The apparatus of claim 14, wherein the scheduling grant is a UL scheduling grant or a UL communication signal.

27. A non-transitory computer-readable medium having program code recorded thereon, the program code comprising:
    code for causing a wireless communication device to determine a predicted data size based on an energy budget and a per-bit transmission energy;
    code for causing the wireless communication device to determine a buffer status report (BSR) based on at least a first data size and the predicted data size;
    code for causing the wireless communication device to transmit the BSR;
    code for causing the wireless communication device to receive a scheduling grant in response to the BSR; and
    code for causing the wireless communication device to transmit a communication signal based on the scheduling grant.

28. An apparatus comprising:
    means for determining a predicted data size based on an energy budget and a per-bit transmission energy;
    means for determining a buffer status report (BSR) based on at least a first data size and the predicted data size;
    means for transmitting the BSR;
    means for receiving a scheduling grant in response to the BSR; and
    means for transmitting a communication signal based on the scheduling grant.

* * * * *